(12) United States Patent
Shallenberger et al.

(10) Patent No.: US 8,821,625 B2
(45) Date of Patent: Sep. 2, 2014

(54) APPARATUS AND METHOD FOR RE-CIRCULATING WASH WATER USED IN MANUFACTURING GLASS FIBER PRODUCTS

(75) Inventors: David L. Shallenberger, Newark, OH (US); Terry Burn, Kansas City, MO (US); Liang Chen, New Albany, OH (US); William Cooper, Johnstown, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/313,086

(22) Filed: Dec. 7, 2011

(65) Prior Publication Data

US 2012/0145035 A1 Jun. 14, 2012

Related U.S. Application Data

(60) Provisional application No. 61/421,301, filed on Dec. 9, 2010, provisional application No. 61/421,306, filed on Dec. 9, 2010, provisional application No. 61/421,310, filed on Dec. 9, 2010, provisional application No. 61/421,304, filed on Dec. 9, 2010.

(51) Int. Cl.
| | |
|---|---|
| C08L 1/00 | (2006.01) |
| C08L 3/00 | (2006.01) |
| C08L 5/00 | (2006.01) |
| C09D 101/00 | (2006.01) |
| C09D 103/00 | (2006.01) |
| C09D 105/00 | (2006.01) |
| C08L 1/26 | (2006.01) |
| C09D 101/26 | (2006.01) |
| C08L 3/02 | (2006.01) |
| C09D 4/00 | (2006.01) |
| C09J 4/00 | (2006.01) |

(52) U.S. Cl.
USPC .............. 106/206.1; 106/162.1; 106/162.81; 106/203.1

(58) Field of Classification Search
USPC .................. 106/206.1, 162.1, 162.81, 203.1
See application file for complete search history.

(56) References Cited

U.S. PATENT DOCUMENTS

| | | | |
|---|---|---|---|
| 2,647,851 A | 8/1953 | Schwartz | |
| 2,707,690 A | 5/1955 | Pearson | |

(Continued)

FOREIGN PATENT DOCUMENTS

| | | |
|---|---|---|
| WO | 2008/085461 | 7/2008 |
| WO | 2012/007843 | 6/2012 |
| WO | 2012/078740 | 6/2012 |

OTHER PUBLICATIONS

Office action from U.S. Appl. No. 13/763,819 dated Aug. 8, 2013.

(Continued)

*Primary Examiner* — James McDonough
(74) *Attorney, Agent, or Firm* — Calfee, Halter & Griswold LLP

(57) ABSTRACT

A method of re-circulating washwater used to clean production components for the manufacture of fibrous insulation, e.g. fiberglass is disclosed. The method includes providing a bulk washwater recovery loop to re-circulate washwater used to clean the downstream air components, as well as a separate hoodwall washwater recovery loop to re-circulate hoodwall washwater. Re-circulated hoodwall washwater may be used to clean the forming hood components and for preparation of binder dispersions. In the latter case, the pH of the hoodwall washwater is measured and the binder dispersion may be prepared with 100% hoodwall washwater, 100% makeup water, or a blend of each depending on and in response to the pH measurement.

16 Claims, 5 Drawing Sheets

(56) References Cited

U.S. PATENT DOCUMENTS

| | | |
|---|---|---|
| 3,020,585 A | 2/1962 | Piot et al. |
| 3,347,648 A | 10/1967 | Krakauer et al. |
| 3,355,314 A | 11/1967 | Gagnon et al. |
| 3,356,565 A | 12/1967 | Smucker et al. |
| 3,467,739 A | 9/1969 | Palmer et al. |
| 3,495,808 A | 2/1970 | Klein et al. |
| 3,539,316 A | 11/1970 | Trethewey |
| 3,625,667 A | 12/1971 | Pitt et al. |
| 3,684,467 A | 8/1972 | Smucker |
| 3,762,896 A | 10/1973 | Borst |
| 3,791,807 A | 2/1974 | Etzel et al. |
| 3,824,387 A | 7/1974 | Garst |
| 3,826,903 A | 7/1974 | Varrasso |
| 3,877,911 A | 4/1975 | Borst |
| 3,902,878 A | 9/1975 | Hoag et al. |
| 3,966,600 A | 6/1976 | Crowley et al. |
| 4,071,339 A | 1/1978 | Grifiths et al. |
| 4,141,709 A | 2/1979 | Reese |
| 4,263,033 A | 4/1981 | Michalek |
| 4,451,276 A | 5/1984 | Barthe et al. |
| 4,517,242 A | 5/1985 | Sinha et al. |
| 4,582,520 A | 4/1986 | Sturm |
| 4,592,956 A | 6/1986 | Gaa et al. |
| 4,728,573 A | 3/1988 | Temple |
| 4,822,392 A | 4/1989 | Fachat et al. |
| 4,832,723 A | 5/1989 | Shsler et al. |
| 5,108,798 A | 4/1992 | Guerro et al. |
| 5,324,338 A | 6/1994 | Holmstrom |
| 5,470,658 A | 11/1995 | Gasca et al. |
| 5,601,629 A | 2/1997 | Helbing |
| 5,690,715 A * | 11/1997 | Schiwek .................. 65/448 |
| 6,699,945 B1 | 3/2004 | Chen et al. |
| 6,884,849 B2 | 4/2005 | Chen et al. |
| 7,063,983 B2 | 6/2006 | Chen |
| 7,157,524 B2 | 1/2007 | Chen et al. |
| 7,185,516 B2 | 3/2007 | Cline et al. |
| 7,226,522 B2 * | 6/2007 | Perander et al. .......... 156/296 |
| 7,251,959 B2 | 8/2007 | Cline et al. |
| 7,326,304 B2 * | 2/2008 | Cline et al. .............. 134/10 |
| 7,435,444 B2 | 10/2008 | Freeman et al. |
| 7,718,214 B2 | 5/2010 | Charbonneau |
| 7,743,629 B2 | 6/2010 | Miele et al. |
| 7,754,020 B2 | 7/2010 | Cline et al. |
| 8,091,388 B2 | 1/2012 | Cooper et al. |
| 2002/0129624 A1 | 9/2002 | Gao et al. |
| 2003/0041626 A1 | 3/2003 | Yang et al. |
| 2004/0074262 A1 | 4/2004 | Miele et al. |
| 2004/0152824 A1 | 8/2004 | Dobrowolski |
| 2005/0192390 A1 | 9/2005 | Dobrowolski et al. |
| 2005/0215153 A1 | 9/2005 | Cossement et al. |
| 2006/0005580 A1 | 1/2006 | Espiard et al. |
| 2006/0019024 A1 | 1/2006 | Freeman et al. |
| 2006/0198954 A1 | 9/2006 | Frechem et al. |
| 2007/0014995 A1 | 1/2007 | Chacko et al. |
| 2007/0157675 A1 | 7/2007 | Cline et al. |
| 2007/0287018 A1 | 12/2007 | Tutin et al. |
| 2008/0156041 A1 | 7/2008 | Cooper et al. |
| 2009/0004391 A1 | 1/2009 | Olang et al. |
| 2009/0007644 A1 | 1/2009 | Freeman et al. |
| 2009/0031759 A1 | 2/2009 | Evans et al. |
| 2010/0068103 A1 | 3/2010 | Charbonneau et al. |
| 2010/0147032 A1 | 6/2010 | Chacko et al. |
| 2010/0151223 A1 | 6/2010 | Chacko et al. |
| 2011/0086567 A1 * | 4/2011 | Hawkins et al. .......... 442/327 |
| 2011/0091710 A1 | 4/2011 | Mirth et al. |
| 2012/0144868 A1 | 6/2012 | Mirth |
| 2012/0144870 A1 | 6/2012 | Johnson |
| 2013/0152637 A1 | 6/2013 | Mirth et al. |
| 2013/0152638 A1 | 6/2013 | Johnson et al. |

OTHER PUBLICATIONS

Office action from U.S. Appl. No. 13/313,094 dated Apr. 3, 2012.
Office action from U.S. Appl. No. 13/313,094 dated Sep. 21, 2012.
Office action from U.S. Appl. No. 13/313,109 dated Oct. 9, 2012.
Office action from U.S. Appl. No. 13/313,109 dated Apr. 4, 2012.
International Search Report and Written Opinion from PCT/US11/063715 dated Apr. 3, 2012.
International Search Report and Written Opinion from PCT/US11/063720 dated Apr. 12, 2012.
Office action from New Zealand Application No. 612,064 dated Nov. 26, 2013.

* cited by examiner

APPARATUS AND METHOD FOR RE-CIRCULATING WASH WATER USED IN MANUFACTURING GLASS FIBER PRODUCTS

CROSS-REFERENCE TO RELATED APPLICATIONS

This application claims priority to provisional application 61/421,301 filed Dec. 9, 2010, incorporated herein by reference. It is also related to several other applications filed Dec. 9, 2010: 61/421,306; 61/421,310; 61/421,304; each incorporated herein by reference.

BACKGROUND

This invention relates in general to insulation products made from fibrous glass. Fibrous glass insulation products generally comprise randomly-oriented glass fibers bonded together by a cured thermosetting polymeric material. Molten streams of glass are drawn into fibers of random lengths and blown into a forming chamber where they are randomly deposited onto a traveling conveyor, growing in thickness to become a fibrous pack. The fibers, while in transit in the forming chamber and while still hot from the drawing operation, are sprayed with an aqueous dispersion or solution of binder. A phenol-formaldehyde binder has been traditionally used throughout the fibrous glass insulation industry, although acidic, formaldehyde-free binders are also known. The residual heat from the glass fibers and from the flow of hot gases during the forming operation is sufficient to vaporize much of the water from the binder, thereby concentrating the binder dispersion and depositing binder on the fibers as a viscous liquid with high solids content. Further water may be removed by drying the binder on the fibers. The uncured fibrous pack is transferred to a curing oven where heated air, for example, is blown through the pack to cure the binder and rigidly bond the glass fibers together in a generally random, three-dimensional structure. Sufficient binder is applied and cured so that the fibrous pack can be compressed for packaging, storage and shipping, yet regains its thickness—a process known as "loft recovery"—when installed.

Viscous binder dispersions, whether in initial state or as the aqueous medium vaporizes, tend to be tacky or sticky and hence they lead to accumulation of fiber and binder solids on the forming chamber walls and other equipment. This accumulated fiber and/or binder resin solids may later fall onto the pack causing dense areas or "wet spots" and other product problems. In the case of acidic binders, accumulation on forming equipment and related components can also cause corrosion.

There have been a variety of attempts to address this corrosion problem. For example, some manufacturers have replaced carbon steel in the forming and washwater equipment with stainless steel. However stainless steel equipment is expensive relative to equipment made of carbon steel. Another proposed solution has been to decrease the amount of cycles that the washwater is introduced through the forming equipment. However, this also leads to increased costs in terms of water usage and wastewater removal. U.S. Pat. No. 7,754,020 to Cline, et al. discloses a method of reducing acid corrosion of the surfaces of equipment used to form fiberglass insulation, by using two distinct washwater systems. One system reclaims washwater from the forming chamber wall only and recycles it either for subsequent chamber wall wash cycles, or for mixing with binder solutions, in which case acid may be added to lower the pH. The second washwater system reclaims water from other areas of the forming operation and the pH of this water may be adjusted upward by adding base to the washwater when the pH drops below about 8.

SUMMARY OF THE INVENTION

This invention relates to recycling of hoodwall washwater for reuse in the preparation of binder dispersions. In a first aspect, the invention relates to a method of recycling washwater used to clean production components for the manufacture of mineral fiber products, the production components including at least forming hood components in which a low pH binder is used with mineral fibers to form a fibrous pack, the method comprising the steps of:
  collecting washwater in a hoodwall washwater recovery loop that receives hoodwall washwater from a hoodwall cleaning system for cleaning the forming hoodwall and re-cycling the hoodwall washwater for re-use in the preparation of binder dispersions;
  measuring the pH of the hoodwall washwater in the separate hoodwall washwater recovery loop; and
  preparing a low pH binder dispersion, wherein the proportion of hoodwall washwater used to prepare the binder dispersion is determined in response to said pH measurement, such that if the pH is less than a predetermined lower limit, L, the hoodwall washwater is used exclusively; if the pH is more than a predetermined upper limit, U, the hoodwall washwater is not used and makeup water is used instead; and if the pH is between L and U, a blend of hoodwall washwater and makeup water is used.

In another aspect, the invention relates to a method of preparing a binder dispersion using re-cycled washwater, the method comprising:
  recovering washwater used to clean forming hood components in which a low pH binder is used with mineral fibers to form a fibrous pack, the washwater being recovered by means of a hoodwall washwater recovery loop;
  measuring the pH of the hoodwall washwater in the separate hoodwall washwater recovery loop; and
  preparing a low pH binder dispersion, wherein the amount of recovered hoodwall washwater used to prepare the binder dispersion is varied in response to said pH measurement, such that if the pH is less than a predetermined lower limit, L, the hoodwall washwater is used exclusively; if the pH is more than a predetermined upper limit, U, the hoodwall washwater is not used and water from a makeup source is used instead; and if the pH is between L and U, a blend of hoodwall washwater and makeup water is used.

In yet another aspect, the invention relates to a method of preparing a binder dispersion using re-cycled washwater, the method comprising:
  recovering washwater used to clean forming hood components in which a low pH binder is used with mineral fibers to form a fibrous pack, the washwater being recovered by means of a hoodwall washwater recovery loop; and
  preparing a low pH binder dispersion, wherein the amount of recovered hoodwall washwater used to prepare the binder dispersion is varied in response to the pH of existing binder dispersion, such that if the pH is less than a predetermined lower limit, L, the hoodwall washwater is used exclusively; if the pH is more than a predetermined upper limit, U, the hoodwall washwater is not used and makeup water is used instead; and if the pH is between L and U, a blend of hoodwall washwater and makeup water is used.

For any of the first three aspects, when the pH lies between L and U, the blend of hoodwall washwater and water from a makeup source may be proportioned according to a step function algorithm or a continuous function algorithm, including linear or logarithmic. For example, the blend of hoodwall washwater and water from a makeup source may be proportioned such that the fraction of hoodwall washwater in the blend is (U−pH)/(U−L).

The hoodwall washwater recovery loop supplies recycled washwater to the binder preparation area, optionally a binder dispersion tank, where it is used to make binder dispersions. Binder dispersions may be made from any binder, but acidic, formaldehyde-free binders are preferred, specifically natural starch binder dispersions. The hoodwall washwater recovery loop may also supply washwater to the hoodwall cleaning system in addition to the binder dispersion tank. Preferably the mineral fibers are glass fibers; and a further step may include filtering the washwater by screen, sieve or filter to remove particulate matter such as glass fibers and agglomerated binder.

In a fourth aspect, the invention relates to a washwater recovery system for a mineral fiber product forming line having a forming hood component including at least one hoodwall defining a forming area and a low pH binder dispensing system, the forming line also having downstream air components including a bulk cleaning system operable to clean the downstream air components, said washwater recovery system comprising:

a bulk washwater recovery loop operable to collect bulk washwater from the downstream air components for return to the bulk cleaning system for re-use; and a separate hoodwall washwater recovery loop operable to collect hoodwall washwater from the forming hood and recycle it for re-use in the preparation of low pH binder dispersion, said hoodwall washwater recovery loop comprising:

conduit for receiving washwater collected from the forming hood walls and transferring it to a storage tank and for recycling said washwater back to a binder dispersion tank;

a pH sensor for measuring the pH of said hoodwall washwater or existing binder dispersion and generating a first signal in response to the measured pH;

a source of makeup water;

a valve system for adjusting the flow of makeup water and the flow of hoodwall washwater to an area for binder preparation; and a processor for controlling the valve system to control the flow of makeup water and the flow of hoodwall washwater in response to the pH of the hoodwall washwater.

The washwater recovery system may include a processor that is programmable to receive first signal inputs for pH lower and upper limits, L and U, respectively, and to generate a second signal to operate the valve system such that the flow to the binder dispersion tank is 100% hoodwall washwater if the first signal indicates a pH below L, 100% makeup water if first signal indicates a pH above U, and a blend of hoodwall washwater and makeup water if first signal indicates a pH between L and U. As before, washwater recovery system may further comprise a hoodwall cleaning system that also receives hoodwall washwater and re-uses it for additional washing of hoodwalls. The washwater recovery system may further comprise a screen, a sieve or a filter (or any combination of these) disposed in the recovery loop for removing particulate matter from hoodwall washwater.

Various aspects of this invention will become apparent to those skilled in the art from the following detailed description of the preferred embodiment, when read in light of the accompanying drawings.

DETAILED DESCRIPTION

Figure 1:
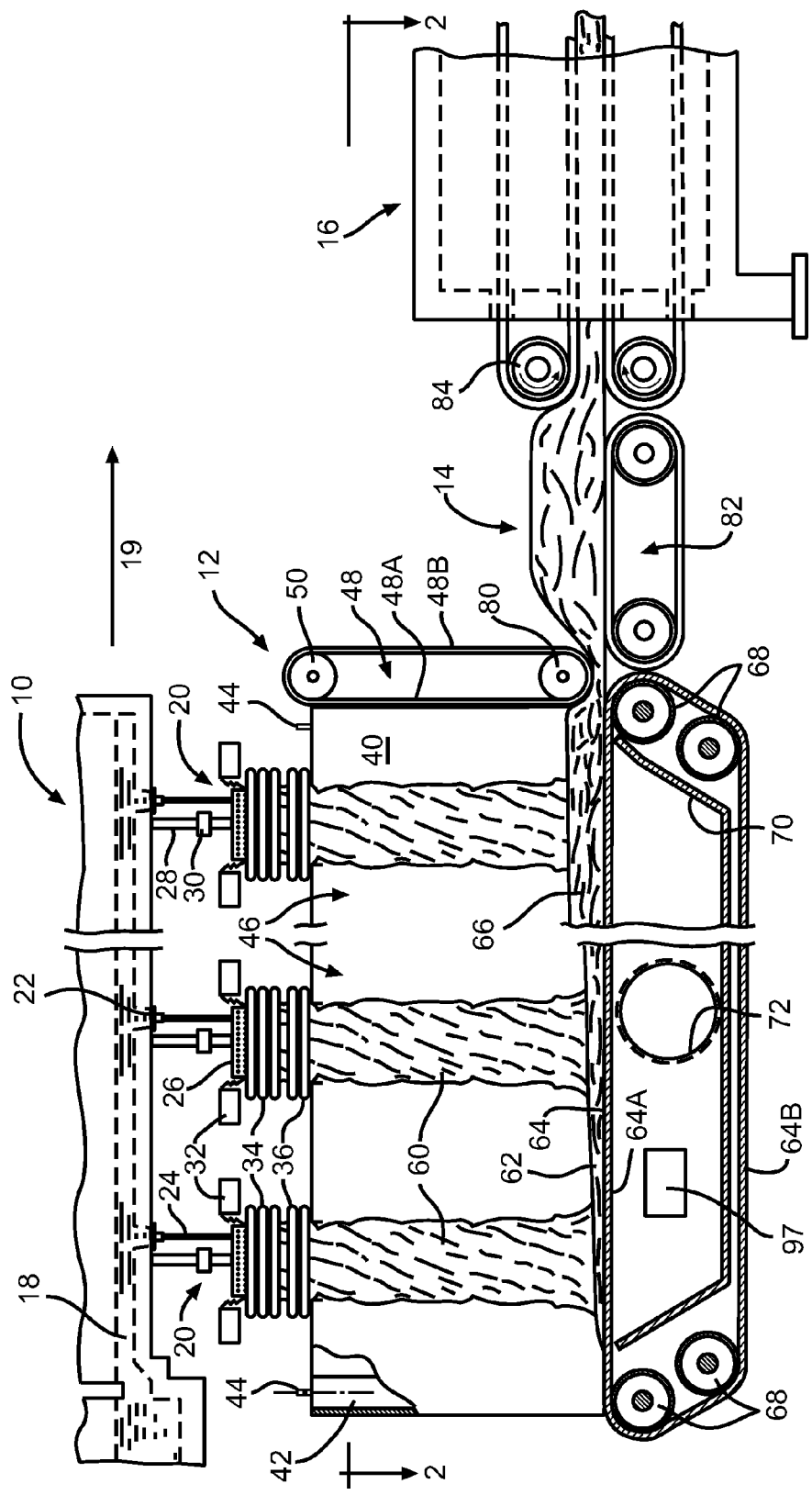
FIG. 1 is a partially sectioned side elevation view of a forming hood component of a manufacturing line for manufacturing fibrous products.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity.

Unless otherwise indicated, all numbers expressing ranges of magnitudes, such as angular degrees or sheet speeds, quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 degrees discloses, for example, 35 to 50 degrees, 45 to 85 degrees, and 40 to 80 degrees, etc.

"Binders" are well known in the industry to refer to thermosetting organic agents or chemicals, often polymeric resins, used to adhere glass fibers to one another in a three-dimensional structure that is compressible and yet regains its loft when compression is removed. As solids, a rate of "delivery" of "binder," "binder chemical" or "binder solids" is properly considered in mass/time units, e.g. grams/minute—not normally as a "flow rate". However, binder is typically delivered as an aqueous dispersion of the binder chemical, which may or may not be soluble in water. "Binder dispersions" thus refer to mixtures of binder chemicals in a medium or vehicle and, as a practical matter, delivery of binder "dispersions" is given in flow rate of volume/time. e.g. liters/minute or LPM of the dispersion. The two delivery expressions are correlated by the mass of binder per unit volume, i.e. the concentration of the binder dispersion. Thus, a binder dispersion having X grams of binder chemical per liter flowing at a delivery rate of Z liters per min delivers X*Z grams/minute of binder chemical. Dispersions include true solutions, as well as colloids, emulsions or suspensions.

One specific type of binder dispersion—referred to as a "binder concentrate"—is a stock dispersion having a relatively high, fixed concentration, e.g. 20-40%, of binder solids that can be subsequently diluted with a binder "diluent" (typically more water) to produce a diluted "binder dispersion" having a lower concentration, e.g. 10%, of binder. This diluted, "ultimate" binder dispersion is then sprayed or dispensed on the glass fibers. A constant delivery of binder chemical (grams/minute) may still be achieved by a higher flow rate of a more dilute binder dispersion. The term "binder dispersion" is generic for both the ultimate, diluted form and the concentrated stock form. Binder dispersions of 25-30% solids may be used for some commercial products, while binder dispersions of 5-15% solids may be used for other products, such as residential products. Binder tackiness and viscosity in the forming hood are important properties impacting product properties, and are dependent on the concentration (% solids), the particular binder chemistry and the temperature.

References to "acidic binder" or "low pH binder" mean a binder having a dissociation constant (Ka) such that in an aqueous dispersion the pH is less than 7, generally less than about 6, and more typically less than about 4.

"Lines" and "conduits" are used interchangeably to refer to channels or piping or other means for directing the flow of liquids, such as washwater.

"Makeup water" refers to binder-free water added into the otherwise closed washwater recovery system from an external source that may include pond, river, lake, fresh, well, city or other source of water. Makeup water is generally clean and near neutral pH, that is, having a pH between about 6.5 and about 7.5 although in some cases the pH may be as low as about 6.0 or as high as about 9.5. Also in some cases makeup water may include washwater from other areas or systems.

"Mineral fibers" refers to any mineral material that can be melted to form molten mineral that can be drawn or attenuated into fibers. Glass is the most commonly used mineral material for fibrous insulation purposes and the ensuing description will refer primarily to glass fibers, but other mineral materials useful for insulation include rock, slag and basalt.

FIG. 1 illustrates a glass fiber insulation product manufacturing line including a forehearth 10, forming hood component or section 12, a ramp conveyor section 14 and a curing oven 16. Molten glass from a furnace (not shown) is led through a flow path or channel 18 to a plurality of fiberizing stations or units 20 that are arranged serially in a machine direction indicated by arrow 19 in FIG. 1. At each fiberizing station, holes or bushings 22 in the flow channel 18 allow a stream of molten glass 24 to flow into a spinner 26, which may optionally be heated by a burner (not shown). Fiberizing spinners 26 are rotated about a shaft 28 by motor 30 at high speeds such that the molten glass is forced to pass through tiny orifices in the circumferential sidewall of the spinners 26 to form primary fibers. Blowers 32 direct a gas stream, typically air, in a substantially downward direction to impinge the fibers, turning them downward and attenuating them into secondary fibers that form a veil 60 that is forced downwardly. The fibers are distributed in a cross-machine direction by mechanical or pneumatic "lappers" (not shown), eventually forming a fibrous layer 62 on a porous conveyor 64 or chain. The layer 62 gains mass (and typically thickness) with the deposition of additional fiber from the serial fiberizing units, thus becoming a fibrous "pack" 66 as it travels in a machine direction 19 through the forming area 46.

One or more cooling rings 34 spray coolant liquid, such as water, on veil 60 to cool the forming area and, in particular, the fibers within the veil. Other coolant sprayer configurations are possible, of course, but rings have the advantage of delivering coolant liquid to fibers throughout the veil 60 from a multitude of directions and angles. A binder dispensing system includes binder sprayers 36 to spray binder onto the veil 60. Illustrative coolant spray rings and binder spray rings are disclosed in US Pat. Publication 2008-0156041 A1, to Cooper, incorporated herein by reference. A specific sprayer ring is discussed in related patent application designated by U.S. Ser. No. 61/421,306. Each fiberizing unit 20 thus comprises a spinner 26, a blower 32, one or more cooling liquid sprayers 34, and one or more binder sprayers 36. FIG. 1 depicts three such fiberizing units 20, but any number may be used. For insulation products, typically from two to about 15 units may be used in one forming hood component for one line.

Figure 2:
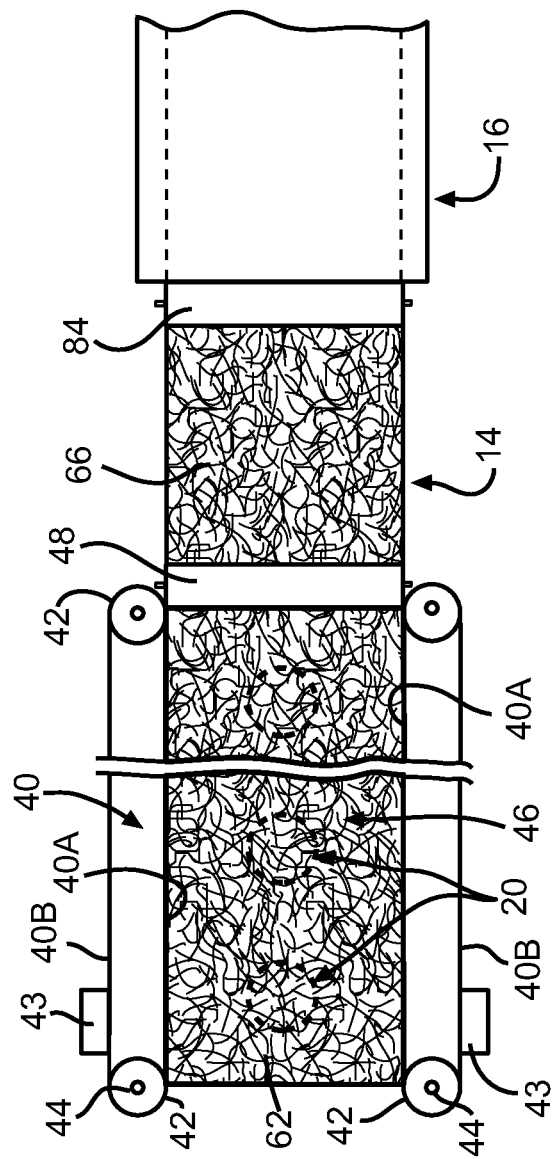
FIG. 2 is a partially sectioned top view taken along line 2-2 of FIG. 1.

As shown in FIGS. 1 and 2, the forming hood section or component 12 is further defined by at least one hood wall 40, and usually two such hood walls on opposing sides of the conveyor 64 to define a forming chamber or area 46. For clarity in FIG. 1, the hood wall 40 is depicted on only one side (behind conveyor 64), and a portion of the wall 40 on the left end is removed to reveal a roller 42 and its axis 44. Typically, each of the hood walls 40 takes the form of a loop or belt having two flights 40A and 40B (see FIG. 2). Inward facing flight 40A defines a sidewall of the forming area 46 and moves through the forming area by rotating about vertical rollers 42; while outside flight 40B closes the loop outside of the forming area 46. End walls 48 (one shown at the right end of the forming area 46) of similar belt construction may further enclose the forming area 46 with an inward facing flight 48A and an outward return flight 48B. As shown in FIGS. 1 and 2, however, the rollers 50, 80 for the end wall 48 may be oriented transversely compared to the rollers 42. A similar end wall (not shown) may be present on the left end of the forming area 46.

The belt loop construction of these forming hood walls 40, 48 facilitates the ability to clean them separately from other downstream air components. A hoodwall cleaning system 43, typically comprising a wiper or scraper blade and a sprayer or dispenser is disposed along a leading edge of the outside flights 40B and 48B. A source of washing water is fed to the cleaning system 43 and the sprayer sprays water on the outside flight 40B of the hoodwall, thus aiding the scraper to remove debris (e.g. binder and glass fibers) that has accumulated on the hoodwall 40. The exact configuration of the cleaning system 43 is not critical, provided that washwater from this hoodwall cleaning system 43 can be segregated from bulk washwater cleaning systems 97.

"Forming hood components" 102 means at least one hood wall, more typically including two side hoodwalls 40 and optional end walls 48, that define the fibrous pack forming area 46 above the conveyor 64 and below the fiberizing units 20. The terms "forming hoodwall", "hoodwall" and "hood wall" may be used interchangeably herein. While most of the binder sprayed into the forming area ends up in the fibrous pack, it has been found that as much as about 90% of the binder that does not remain in the pack accumulates instead on the hoodwalls. Only a minor portion (e.g. less than about 10% of the binder that does not remain in the pack) passes through to reach the conveyor 64, or other downstream components.

Distinct from "forming hood components" are the "downstream air components" 92, which have the primary purpose of creating and maintaining a negative pressure below the chain or conveyor 64 in order to draw through the air injected to the forming area 46 by blowers 32. The "downstream air components" 92 thus include the air handling system downstream from the conveyor 64, including the conveyor 64 itself. Note that "downstream" here refers to the direction of airflow, not the machine direction 19. Conveyor 64 is porous and may also include two flights 64A and 64B. Upper flight 64A travels in the machine direction 19, revolves about one or more rollers 68 to lower flight 64B which revolves about further rollers 68 to complete the belt. Other downstream air components 92 are found beneath the upper flight 64A of conveyor chain 64. Here, one or more suction boxes 70 are connected via duct 72 to a drop out box 74 (refer to FIG. 5). Dropout box 74 is just one type of particle separator that decelerates the air flow to allow particulates to fall and separate from the air stream. Other particle separators might include cyclonic separators, demisters and the like. Further downstream, a forming fan or blower 76, and its housing, ultimately provide the negative pressure in the suction box 70 that aids in removing air entering the forming area 46 to reduce turbulence. A final portion of the downstream air components 92 includes further ductwork leading ultimately to a discharge stack (not shown). In spite of the negative pressure provided by the downstream air components 92, the airflow and turbulence caused by the blowers 32 frequently cause binder from sprayers 36 and glass fibers from the veil 60 to become adhered to the hood walls 40, 48 as described above.

Still referring to FIGS. 1 and 2, the uncured pack 66 exits the forming hood area 46 under roller 80 and, in the absence of the downward influence of the blowers 32 and the suction box 70, (optionally aided by a pack lift fan, not shown) the uncured pack 66 immediately regains a certain degree of loft or height ("ramp height") as it travels along the conveyor 82 toward the curing oven 16. Spaced-apart rollers or porous conveyors 84 force the pack 66 down to a desired thickness (or "bridge height") and the product is cured at this thickness in the oven 16. The emerging cured product, or "blanket", then continues to cutting and packaging steps.

A problem associated with glass fiber forming operations is the tendency for the extreme heat and air flow from the glass, forehearth, combustion gasses and the blower air to cause premature drying, flashing or vaporization of the binder dispersion. Such premature drying causes the dispersion to become very concentrated and viscous, and causes some binder solids to become stuck to the conveyor 64 or even to pass through the conveyor and stick to other downstream air components or, potentially, to exit as exhaust emissions.

Attempts to reduce such noxious emissions include the use of formaldehyde-free binder systems employing a binder comprising a polycarboxylic acid polymer and a polyol. One example of a formaldehyde-free binder composition is a polyacrylic acid polymer as described in U.S. Pat. Nos. 6,884,849 and 6,699,945 to Chen, et al. Other approaches to formaldehyde-free resins include binders made from natural starches (or dextrins or other polysaccharides of varying length) and polyfunctional organic acids like citric or maleic acids, such as those disclosed in commonly owned U.S. patent application Ser. No. 12/900,540, filed Oct. 8, 2010. In both cases, the binder dispersions are acidic due to the carboxylic acid groups.

These novel acid-based binder systems, however, are best employed at low pH, for example, less than about pH 6 and often less than pH 3. The degree of cure reached in the oven can be sensitive to variations in the pH of the curing pack. Furthermore, the acidic solutions exacerbate corrosion of equipment; and disposal of acidic waste streams is also a problem.

Figure 3:
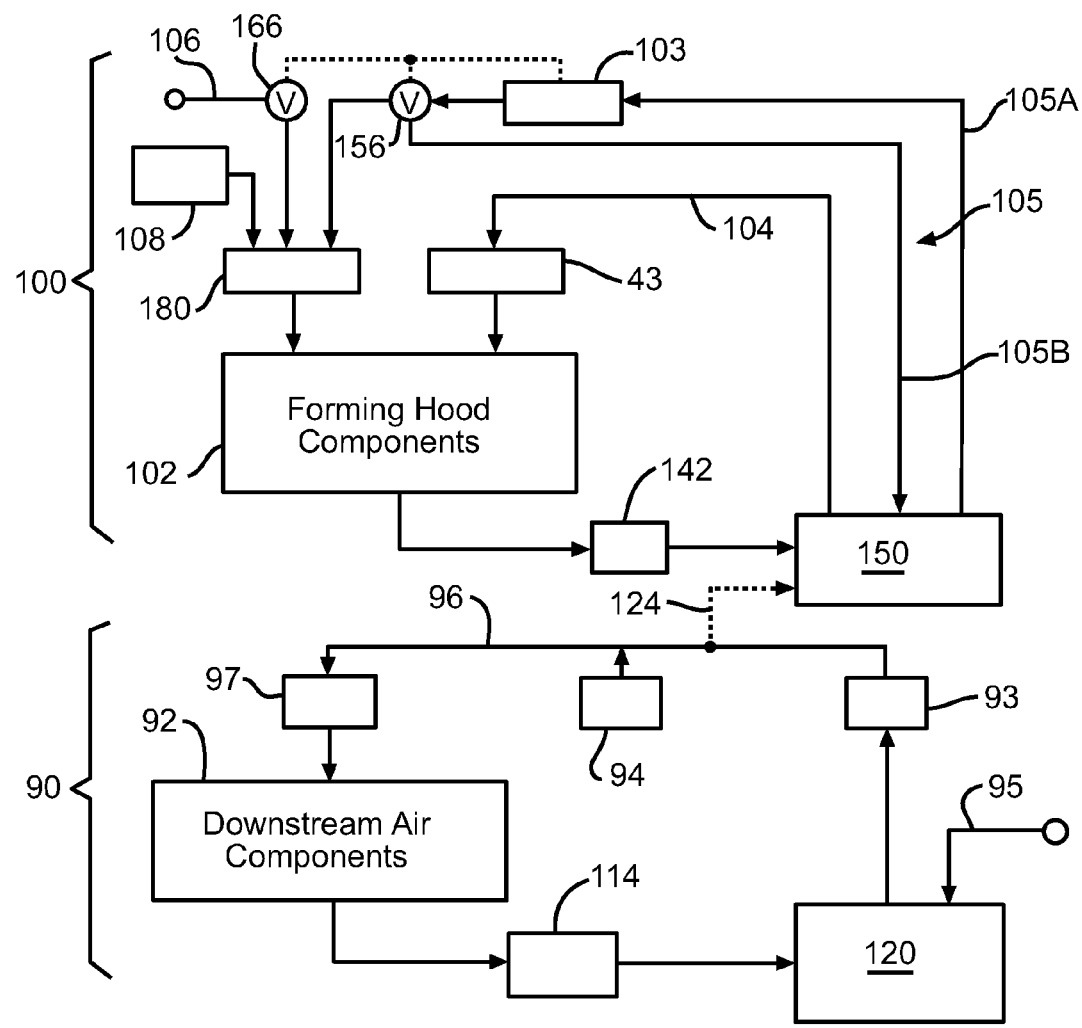
FIG. 3 is a simplified schematic diagram showing distinct recovery loop systems for a bulk washwater recovery system and a hoodwall washwater recovery system.

Referring to FIG. 3, a brief schematic is provided for a washwater control system that minimizes corrosion and reduces acidic waste by recycling waste washwater in separate, distinct recovery loops. The system thus comprises a first or "bulk" washwater recovery loop 90 that is used for the "downstream air components" 92 and a second or "hoodwall" washwater recovery loop 100 that is used for the forming hood components 102. It is desirable to segregate these washwater systems since it is preferable to use high pH washwater on the "downstream air components" 92 to reduce the effect of acidic corrosion, yet it is desirable to maintain the acidity of the binder solution for reuse in the forming hood, e.g. for mixing up new batches of binder dispersions. As mentioned, segregation is facilitated by the belt construction of the hoodwalls 40, 48, and by orienting the cleaning system 43 on the outside flight 40B of hoodwall 40.

In the "bulk" washwater recovery loop 90, waste washwater is screened or filtered at 114 to remove glass fibers, collected in bulk washwater supply tank 120. Additional makeup water may be added at 95 to maintain the level in supply tank 120. From supply tank 120, bulk washwater is re-circulated via line 96 back to bulk cleaning system 97 for spraying and washing of downstream air components 92 to complete the recovery loop. Within the loop, pH may be measured at sensor 93 and if the pH is at or below a predetermined target set point, a base such as sodium hydroxide may be added at 94 before the washwater is returned to the bulk cleaning system 97. Maintaining an alkaline bulk washwater minimizes the corrosive effect of any low pH binder that does reach downstream air components 92.

In the "hoodwall" washwater recovery loop 100, waste washwater from the hoodwall is filtered at 142 and collected as filtered hoodwall washwater (FWS) in a binder reclaim tank 150. To replenish the level in the binder reclaim tank 150, water may be added from an alternate source such as makeup water or bulk washwater that may be diverted via cross-system line 124. From binder reclaim tank 150, the FWS may have dual uses upon re-cycling to the forming hood. First, FWS may be used for further hoodwall washing, shown by path 104 leading to a hoodwall cleaning system 43. Second, FWS may be used to prepare new binder dispersion in binder dispersion tank 180, shown by re-circulating loop path 105 with diverter valve 156. The pH of FWS is tested at 103 and the relative amounts of FWS and/or makeup water (from a source via path 106) used in binder dispersion batch preparation are varied using valves 156, 166 according to a predetermined algorithm. As an alternative to measuring the pH of the FWS, one may also measure the pH of an existing binder dispersion and adjust the proportions of FWS and makeup water accordingly to yield a desired pH range for preparation of new binder dispersion.

The algorithm for varying the amounts of FWS and makeup water used for binder dispersion preparation should reduce the neutralization that occurs when low pH binder is mixed with less acidic diluent water. For example, if the FWS pH is below a predetermined lower limit or setpoint, L, the FWS water may be used exclusively for binder diluent. Conversely, if the FWS pH is above a predetermined upper limit or setpoint, U, the FWS water is not used but is re-circulated back to binder reclaim tank 150, and makeup water is instead used for binder diluent. If the FWS pH is between the predetermined upper limit, U, and the predetermined lower limit, L, a mixture of FWS water blended with makeup water is used. In each case, additional acid will be added to the binder dispersion tank 180 via the binder chemical agents that make up the low pH binder 108 as per batch requirements.

The predetermined upper and lower limits, U and L respectively, may be set as desired, but will generally be above and below neutral pH of 7, respectively. For example, in some embodiments U may be set at a pH within a range from about 7 to about 9, more likely from about 7.7 to about 8.5; and L may be set at a pH within a range from about 4 to about 6.5, more likely from about 5 to about 6. The choice of exact set points will depend on the specific binder chemistries and on optimization of final product properties, like stiffness, density and loft recovery.

Figure 4:
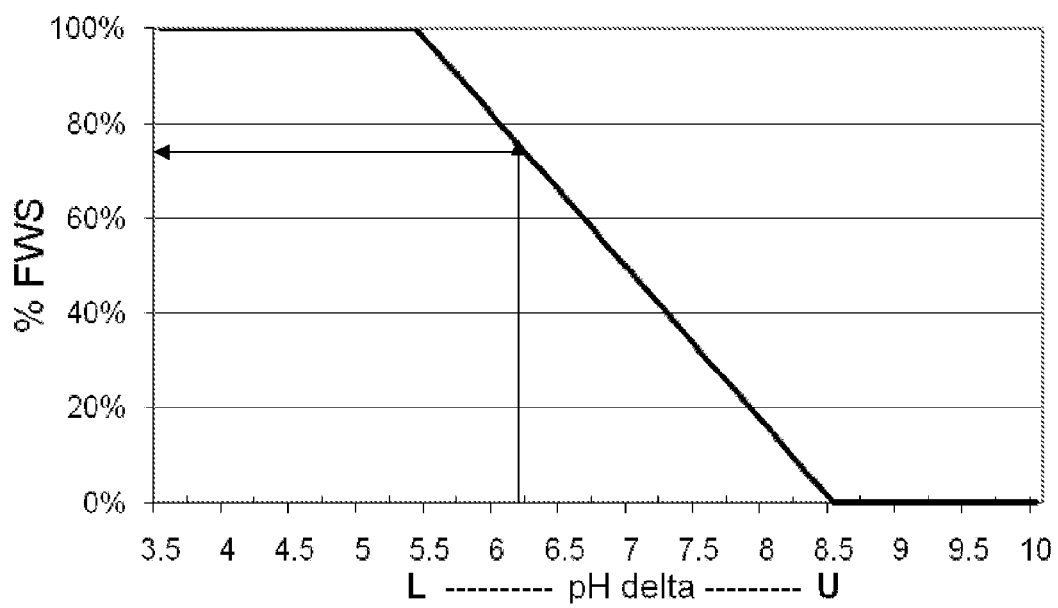
FIG. 4 is a graph illustrating an exemplary blending curve in accordance with the present invention.

The blending of FWS water and makeup water when the pH is between the upper and lower limits may follow any algorithm in discontinuous (stepwise) or continuous fashion. For example, in some embodiments, the proportion or percentage of FWS used in the blend can be a linear proportion based on where the measured pH falls along the pH difference between U and L (the "pH delta"). The proportion of FWS is thus given as $(U-pH)/(U-L)$. For a more specific illustration of one example, if U is set at 8.5 and L is set at 5.4 and the FWS is measured at 6.2, then the proportion of FWS to blend is given as $(8.5-6.2)/(8.5-5.4)=2.3/3.1=0.74$ or 74%. More than 50% FWS water is used because the measured pH is closer to the lower setpoint L than to the upper setpoint U. A graph representing this example is shown in FIG. 4. Alternatively, the relationship need not be linear; logarithmic or other continuous mathematical algorithms might be used for blending the FWS and makeup waters.

In yet other embodiments, the blend may be done in stepwise fashion. In the general case, the size, S, of the step increment and the number, N, of them are related by the formula: $(U-L)=N*S$. One selects S or N and divides that into the U-L delta to find the other of N or S. For each incremental step S above a lower limit L, the FWS proportion is reduced by 1/N. For example, if setpoints are at pH 5 and 8, a delta of 3.0, there are 6 (N) steps of 0.5 pH. For each 0.5 pH step above 5, the proportion of FWS is decreased from 100% by ⅙ (N) or about 16.7 percent. As expected, after 3 such steps, the proportion of FWS is decreased by 3*16.7% or about 50%. Of course, other step increments and other setpoints could produce alternative step functions.

Figure 5:
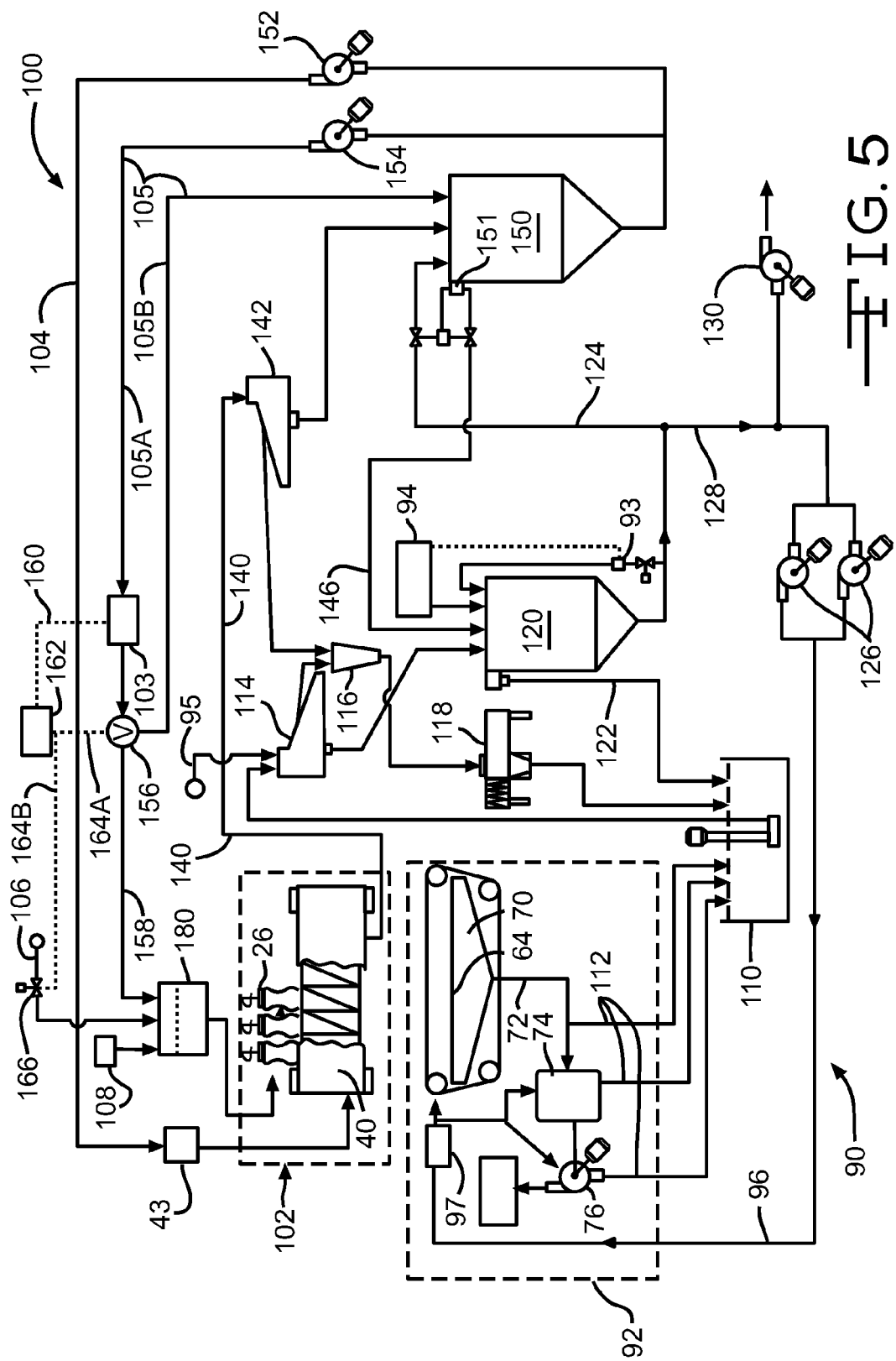
FIG. 5 is a detailed schematic diagram representing the fiberglass forming line with a bulk washwater recovery system and a hoodwall washwater recovery system.

Referring now to FIG. 5, there is provided a detailed schematic diagram of a forming operation with separate and distinct washwater recovery loops 90 and 100 for "downstream air components" 92 and the "forming hood components" 102, respectively. First, a bulk washwater recovery system 90 recovers the washwater used to clean the components 92 of the fiberglass insulation forming equipment other than the forming hood components 102. For example, the bulk washwater recovery system 90 is used to clean components such as the conveyors 64, 82, the forming fan 76 and its housing, the drop out boxes 74, the suction boxes 70 and connecting ductwork 72. The washwater used to clean these "downstream air components" 92 is collected into the washwater sump 110 via conduits or lines 112. The collected washwater is then pumped to one or more shaker screens 114 to remove larger debris particles (e.g., clumped or unclumped glass fibers) from the washwater. These large debris particles are collected in a scrap chute 116 and directed to a dewatering press 118. The recovered washwater is passed from the dewatering press 118 and back into the sump 110. The washwater passing through the shaker screen(s) 114 is directed into a washwater supply tank 120. One or more pH sensors 93 are used to determine the pH of the washwater being discharged from the washwater supply tank 120 and may direct the introduction of a base solution 94, such as sodium hydroxide, into the washwater supply tank 120 to bring the pH of the washwater in the washwater supply tank 120 to approximately 8.0 or above to reduce (minimize) the corrosion of the downstream air components 92.

Any overflow from the washwater supply tank 120 is directed by conduit or line 122 back to the sump 110. Any deficit of washwater in the system 90 can be replenished by the addition of water from an external "makeup water" source or by a remote storage tank (not shown) through line 95. With the exception of cross-system lines 124 and 146 (described below), all the washwater from bulk washwater recovery loop 90 is drawn from the washwater supply tank 120 by pumps 126 through conduit or line 128 and directed back to the bulk cleaning system 97 via line 96 and its branches to be reused to clean the downstream air component equipment (e.g. 64, 70, 72, 74, 76). Optionally, the bulk washwater can be pumped through line 130 to a remote storage tank (not shown).

Second, the forming hood components 102 are washed by washwater that is recovered through a separate closed-loop recovery system 100 to keep the hoodwall washwater, which is generally acidic due to a high concentration of low pH binder, from being combined with the bulk washwater in the bulk washwater recovery system 90. Thus, the amount of base solution 94 that would have to be used to raise the pH of the bulk washwater in the washwater supply tank 120 to a pH of approximately 8.0 or more is reduced, saving costs and wasteful neutralization. In order to reduce or eliminate corrosion of the forming hood components 102 from the low pH hoodwall washwater, the walls 40, 48 are preferably constructed of stainless steel or another non-corrosive metal, plastic (e.g., polypropylene or polyethylene), PVC (polyvinyl chloride) piping, or hard polyvinyl chloride (HPVC) piping. Like the forming hood components 102 themselves, the wetted lines and parts of the hoodwall washwater recovery loop 100 should be made of a corrosion resistant material, such as stainless steel, or contain a corrosion resistant coating layer.

The washwater used to clean the forming hood components 102 in the closed-loop recovery system 100 is collected and directed via conduit or line 140 to one or more shaker screen, sieve or filter 142 where larger debris particles are separated from the hoodwall washwater. Alternatively, recovered washwater may be directed to its own sump (not shown) from which it may be pumped back to filter 142 as needed. Filter 142 directs particulates to a scrap chute 116 to be dewatered at 118, as described above with respect to the bulk washwater recovery system 90. Alternatively, filter 142 may directs particulates to a second scrap chute and dewatering press (not shown) whose effluent goes to the binder reclaim tank 120 or, if used, to a sump for the hoodwall washwater system. A plurality of screens, sieves and filters may be represented by 142 for removing all glass fibers and clumped binder from the hoodwall washwater to produce a filtered washwater, or "FWS".

The FWS passing through the filter 142 is directed into the binder reclaim tank 150. A level sensor 151 monitors the level in binder reclaim tank 150. Any overflow from the binder reclaim tank 150 is directed via line 146 to the bulk washwater supply tank 120 where the hoodwall washwater would be treated with the base solution 94 and converted into bulk washwater. If the level within the binder reclaim tank 150 drops too low, it can be replenished by one of several sources, such as the bulk washwater supply tank 120 via cross-system line 124 or, alternatively, an external makeup water source (not shown). The recovery system 100 is thus "closed loop" except for the makeup source and the two cross system lines 146 and 124 that are only used to maintain appropriate levels in binder reclaim tank 150.

The filtered hoodwall washwater, which has a low pH due to the inclusion of the low pH binder from cleaning the walls 40, 48, may be returned to the forming area 46 for one or both of: (a) delivery to the hoodwall cleaning system 43 for future cleaning of the hoodwalls 40, 48; or (b) reuse in preparing new batches of binder dispersion. In the first case, pump 152 circulates FWS back to the forming hood cleaning system 43 via line 104. Since hoodwall washwater is continuously needed, this re-circulation is ongoing constantly during operation.

In the second case, batches of binder are prepared in binder dispersion tank 180 as needed. Pump 154 continuously re-circulates FWS in a loop via line 105A to a diverter valve 156 and back via line 105B to the binder reclaim tank 150. Diverter valve 156 is capable of diverting FWS via line 158 to the binder dispersion tank 180 whenever a batch of binder is required to be prepared. Diverter valve 156 always allows flow; selecting between outlet line 158 (referred to as "open" to the binder dispersion tank 180) and outlet line 105B back to the binder reclaim tank (referred to herein as "closed" relative to the binder dispersion tank 180).

A pH sensor 103 measures the pH of the FWS within the loop 105A, 105B or in the binder reclaim tank 150 and the pH data signal is fed via line 160 to a processor 162. The processor 162 also receives and stores input values for U and L. Comparator circuitry compares the FWS pH to U and to L, and sends signals via line 164A to diverter valve 156, and via line 164B to makeup water valve 166 to control the valves to achieve the desired blend of FWS with makeup water, which blend may be 100% FWS, 100% makeup water or any proportion in between, according to a predetermined algorithm as discussed above.

When the FWS pH is less than L, the processor 162 closes valve 166 completely and "opens" diverter valve 156 (open to line 158 and binder dispersion tank 180) to allow pump 154 to pump a FWS into the binder dispersion tank 180. The processor switches ("closes") the diverter valve back to line 105B when a sufficient quantity of FWS has been added for the desired batch size of binder dispersion. In contrast, when the FWS pH is greater than upper limit U, the processor 162 leaves diverter valve 156 "closed" to recycle line 105B and opens valve 166 to pump makeup water into the binder dispersion tank 180. This avoids the use of FWS that is too basic for binder dispersion preparation. When the FWS pH is between U and L, the processor 160 opens both valves 156 and 166 to achieve the desired blend and pH for binder preparation.

Using the example discussed above in connection with FIG. 4, where the pH of FWS was measure to be 6.2 and the set points were 8.5 and 5.4, and assuming that a binder batch recipe required 1000 kg of diluent water, the processor would open valve 156 to allow 740 kg FWS to flow into the binder dispersion tank, and would open valve 166 to allow 260 kg to flow. The valves could be controlled to open simultaneously or sequentially; and they could be configured to open in at different flow rates for the same time, or for different time periods at equal flow rates, or a combination of both, to achieve the desired blend. The description thus far has assumed that binder is prepared in discrete batches; however, continuous preparation is also possible by metering into a supply line the correct ratio of binder chemicals and diluent, the diluent being metered according to the algorithm as discussed above.

In operation, the hoodwall washwater recovery system 100 maintains separation between the low pH binder-laden hoodwall washwater and (except in overflow conditions) keeps the hoodwall washwater from being mixed into the bulk washwater recovery system 90, which is neutralized by the addition of a base solution to reduce or prevent corrosion of the forming hood components 102. Accordingly, separation of the low pH hoodwall washwater from the bulk washwater recovery system 90 allows for a reduction in the amount of base solution added to the bulk washwater before being returned to the downstream air components 92. Furthermore, separation of the hoodwall washwater into a segregated closed-loop system and the construction of the forming hoodwall from non-corrosive materials allow the pH of the hoodwall washwater to remain at a low value for re-circulated washing operations, or for binder dispersion preparation.

In the binder reclaim tank 150, the cleaned hoodwall washwater may be optionally cooled by a cooling coil or other means (not shown) as taught by U.S. Pat. No. 7,754,020 to Cline, et al.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of re-cycling washwater used to clean production components for the manufacture of mineral fiber products, the production components including at least forming hood components in which a low pH binder is used with mineral fibers to form a fibrous pack, the method comprising the steps of: collecting washwater in a hoodwall washwater recovery loop that receives hoodwall washwater from a hoodwall cleaning system for cleaning the forming hoodwall and re-cycling the hoodwall washwater for re-use in the preparation of binder dispersions; measuring the pH of the hoodwall washwater in the hoodwall washwater recovery loop; and preparing a low pH binder dispersion, wherein preparing a low pH binder dispersion comprises preparing a natural starch binder dispersion, and wherein the proportion of hoodwall washwater used to prepare the binder dispersion is determined in response to said pH measurement, such that if the pH is less than a predetermined lower limit, L, the hoodwall washwater is used exclusively; if the pH is more than a predetermined upper limit, U, the hoodwall washwater is not used and makeup water is used instead; and if the pH is between L and U, a blend of hoodwall washwater and makeup water is used.

2. The method of claim 1 wherein if the pH is between L and U, the blend of hoodwall washwater and water from a makeup source is proportioned according to a step function algorithm.

3. The method of claim 1 wherein if the pH is between L and U, the blend of hoodwall washwater and water from a makeup source is proportioned according to a continuous function algorithm.

4. The method of claim 3 wherein if the pH is between L and U, the blend of hoodwall washwater and water from a makeup source is proportioned according to a linear function algorithm.

5. The method of claim 4 wherein if the pH is between L and U, the blend of hoodwall washwater and makeup water is proportioned such that the fraction of hoodwall washwater in the blend is (U-pH)/(U-L).

6. The method of claim 1, further comprising using hoodwall washwater recovery loop also to supply washwater to the hoodwall cleaning system.

7. The method of claim 1 wherein the mineral fibers comprise glass fibers.

8. The method of claim 7, further comprising a step of separating glass fibers and particulate binder from the hoodwall washwater.

9. A method of re-cycling washwater used to clean production components for the manufacture of mineral fiber products, the production components including at least forming hood components in which a low pH binder is used with mineral fibers to form a fibrous pack, the method comprising the steps of: collecting washwater in a hoodwall washwater recovery loop that receives hoodwall washwater from a hoodwall cleaning system for cleaning the forming hoodwall and re-cycling the hoodwall washwater for re-use in the preparation of binder dispersions; measuring the pH of the hoodwall washwater in the hoodwall washwater recovery loop; and preparing a low pH binder dispersion including one more of a natural starch, dextrin, or polysaccharide, wherein the proportion of hoodwall washwater used to prepare the binder dispersion is determined in response to said pH measurement, such that if the pH is less than a predetermined lower limit, L, the hoodwall washwater is used exclusively; if the pH is more than a predetermined upper limit, U, the hoodwall washwater is not used and makeup water is used instead; and if the pH is between L and U, a blend of hoodwall washwater and makeup water is used.

10. The method of claim 9, wherein if the pH is between L and U, the blend of hoodwall washwater and water from a makeup source is proportioned according to a step function algorithm.

11. The method of claim 9, wherein if the pH is between L and U, the blend of hoodwall washwater and water from a makeup source is proportioned according to a continuous function algorithm.

12. The method of claim 11, wherein if the pH is between L and U, the blend of hoodwall washwater and water from a makeup source is proportioned according to a linear function algorithm.

13. The method of claim 12, wherein if the pH is between L and U, the blend of hoodwall washwater and makeup water is proportioned such that the fraction of hoodwall washwater in the blend is (U-pH)/(U-L).

14. The method of claim 9, further comprising using hoodwall washwater recovery loop also to supply washwater to the hoodwall cleaning system.

15. The method of claim 9, wherein the mineral fibers comprise glass fibers.

16. The method of claim 7, further comprising a step of separating glass fibers and particulate binder from the hoodwall washwater.

* * * * *